(12) United States Patent
Auriac et al.

(10) Patent No.: US 9,511,846 B2
(45) Date of Patent: Dec. 6, 2016

(54) AIRPLANE FLIGHT DECK EQUIPPED WITH AN EMERGENCY ESCAPE

(71) Applicant: AIRBUS OPERATIONS (S.A.S.), Toulouse (FR)

(72) Inventors: Vincent Auriac, Saint Orens de Gameville (FR); Löic Challancin, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 15/040,599

(22) Filed: Feb. 10, 2016

(65) Prior Publication Data

US 2016/0236765 A1 Aug. 18, 2016

(30) Foreign Application Priority Data

Feb. 11, 2015 (FR) ...................... 15 51100

(51) Int. Cl.
*B64C 1/14* (2006.01)
*E05C 19/12* (2006.01)

(52) U.S. Cl.
CPC ........... *B64C 1/1423* (2013.01); *B64C 1/1407* (2013.01); *E05C 19/12* (2013.01)

(58) Field of Classification Search
CPC ..... B64C 1/32; B64C 1/1407; B64C 1/1423; B64C 1/1461; E05B 65/1033
See application file for complete search history.

(56) References Cited

U.S. PATENT DOCUMENTS

| 2,455,157 | A | * | 11/1948 | Bigelow | B64C 1/32 182/77 |
|---|---|---|---|---|---|
| 3,144,224 | A | * | 8/1964 | Carroll | B64C 1/32 244/129.5 |
| 4,176,812 | A | | 12/1979 | Baker | |
| 4,541,595 | A | | 9/1985 | Fiala et al. | |
| 8,662,450 | B2 | | 3/2014 | Lamat et al. | |
| 2014/0175220 | A1 | | 6/2014 | Durand et al. | |

FOREIGN PATENT DOCUMENTS

| EP | 2 749 492 A1 | 7/2014 |
|---|---|---|
| FR | 2 960 212 A1 | 11/2011 |

OTHER PUBLICATIONS

French Search Report for Application No. 1 551 100 dated Dec. 3, 2015.

* cited by examiner

*Primary Examiner* — Phillip J Bonzell
*Assistant Examiner* — Michael Kreiner
(74) *Attorney, Agent, or Firm* — Jenkins, Wilson, Taylor & Hunt, P.A.

(57) ABSTRACT

An airplane flight deck which includes an escape opening closed off by an emergency door and an emergency hatch. The emergency hatch comprises a sheeting and a locking/unlocking mechanism configured to take up a locked state in which the sheeting closes off the escape opening and an unlocked state in which the sheeting frees the escape opening.

8 Claims, 3 Drawing Sheets

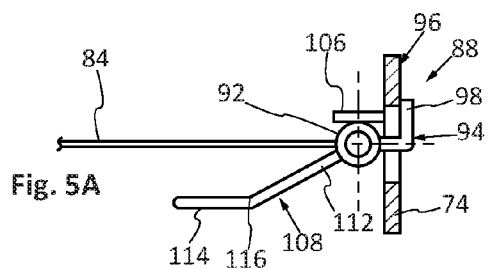
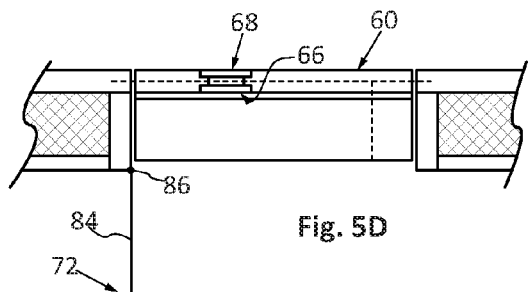
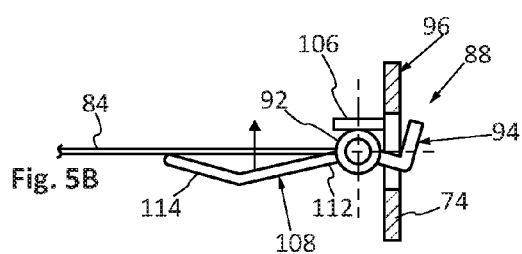
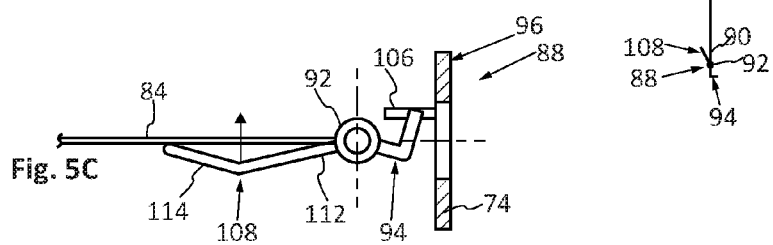
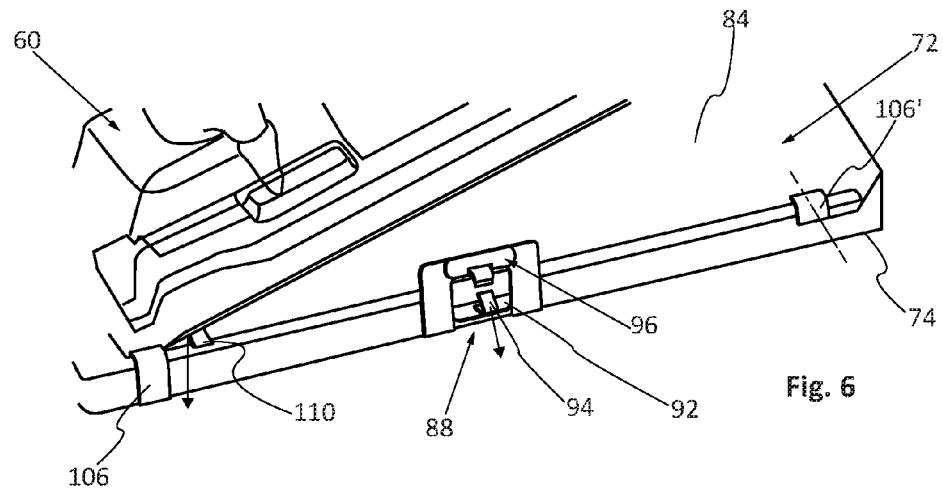

US 9,511,846 B2

AIRPLANE FLIGHT DECK EQUIPPED WITH AN EMERGENCY ESCAPE

CROSS-REFERENCE TO RELATED APPLICATION

This application claims priority to French patent application FR 15 51100 filed Feb. 11, 2015, the entire disclosure of which is incorporated by reference herein.

TECHNICAL FIELD

The present disclosure relates to an airplane flight deck equipped with an emergency escape that is closed off by an emergency door and an emergency hatch.

BACKGROUND

As illustrated in FIGS. 1 and 2, an airplane comprises a skin 10 forming the fuselage, and an internal bulkhead 14 which delimits a flight deck 12.

In order to evacuate the pilots, the airplane comprises an escape opening 18 for bringing the inside of the flight desk 12 into communication with the outside 20 of the airplane, and at least one emergency door 22 for closing off or freeing the escape opening 18. According to an embodiment illustrated in FIG. 1, this emergency door 22 is positioned on the top part of the fuselage, vertically above the flight deck 12. This emergency door 22 comprises a wall with an external surface 24 flush with the external surface of the skin 10 of the fuselage. This emergency door 22 comprises a hinge 26 that allows it to pivot towards the inside of the flight deck, and locking/unlocking means 28 that are controlled by an internal opening controller 30 that is actuatable from the inside of the fuselage and by an external opening controller 32 that is actuatable from the outside of the fuselage. Inside the fuselage, the airplane comprises an emergency hatch 34 which closes off the escape opening 18 and ensures the continuity of the internal bulkhead 14 of the flight deck 12.

This emergency hatch 34 is in the form of a rigid panel which comprises:
- on a first side, goosenecks 36 configured to allow the emergency hatch 34 to pivot into the open position and to come away from the internal bulkhead 14,
- on a second side away from the first side, a locking/unlocking mechanism 38 configured to take up a locked state in which the mechanism 38 holds the emergency hatch 34 in the closed position, and an unlocked state in which it no longer holds the emergency hatch 34 in the closed position and allows it to pivot by virtue of the goosenecks 36,
- on a face of the emergency hatch 34 that is oriented towards the inside of the flight deck, a first controller 40 configured to cause the locking/unlocking mechanism 38 to move from the unlocked state when it is actuated by a person from the inside of the flight deck,
- on a face of the emergency hatch 34 that is oriented towards the emergency door 22, a second controller 42 configured to cause the locking/unlocking mechanism 38 to move from the unlocked state when it is actuated by the emergency door 22 while the latter opens.

The first controller 40 is a handle connected to the locking/unlocking mechanism 38. The second controller 42 is a pivoting lever that is connected to the locking/unlocking mechanism 38 by way of a cable.

According to this configuration, the weight of the emergency hatch 34 favors the pivoting thereof towards the inside of the flight deck when it is no longer held by the locking/unlocking mechanism 38. Consequently, the emergency hatch 34 should have a certain mass in order to function correctly.

SUMMARY

Therefore, the present disclosure provides an emergency hatch which provides the same functions as a prior art emergency hatch while having a lower weight.

To this end, the disclosure herein relates to an airplane flight deck comprising an external skin attached to a structure, an internal bulkhead delimiting or defining the flight deck, and an escape opening passing through the external skin and the internal bulkhead, the escape opening being closed off by:
- an emergency door mounted in a manner hinged on the structure between a closed position, in which the emergency door is disposed in line with the external skin and closes off the emergency opening, and an open position, in which the emergency door pivots towards the inside of the flight deck, the emergency door comprising a locking/unlocking mechanism,
- an emergency hatch that is movable between a closed position, in which the emergency hatch ensures the continuity of the internal bulkhead of the flight deck, and an open position, the emergency hatch comprising an locking/unlocking mechanism.

According to the disclosure herein, the emergency hatch comprises a sheeting permanently connected to the structure by a first side, and the locking/unlocking mechanism comprises:
- a first part secured to a second side, away from the first side, and a second part secured to the structure, the first and second parts engaging in the locked state so as to couple the second side of the sheeting to the structure; and
- a rod secured to the second side and a lever handle that is actuatable from the flight deck and is connected to the rod.

Choosing an emergency hatch in the form of a sheeting makes it possible to reduce the on-board mass compared with a prior art hatch.

Preferably, the sheeting is elastic or comprises at least one elastic strip such that the sheeting is tautened when it closes off the escape opening. This configuration favors the passage from the locked state to the unlocked state. Thus, it is not the weight of the emergency hatch which favors its opening but the elasticity of the sheeting.

According to a first variant, the first part of the locking/unlocking mechanism comprises a hook secured to the rod, the hook engaging with the second part comprising a strike.

According to this first variant, the emergency hatch comprises at least one stabilizing tab secured to the structure, the stabilizing tab being configured to limit the tilting of the rod towards the emergency door when the sheeting is closing off the escape opening.

According to this first variant, the locking/unlocking mechanism comprises a lever which has a first end connected to the rod and a second end oriented towards the emergency door, the lever being actuatable automatically by the emergency door as it pivots towards the inside of the flight deck.

According to a second variant, the locking/unlocking mechanism comprises a second rod which has at least one hook configured to retain the first rod, the second rod being connected to the structure by way of a pivot link so as to take up a holding position in which the hook retains the first rod and a pivoted position in which the hook no longer retains the first rod.

According to this second variant, the locking/unlocking mechanism comprises at least one torsion spring configured to hold the second rod in the holding position.

Preferably, according to this second variant, the locking/unlocking mechanism comprises a lever which has a first end connected to the second rod and a second end oriented towards the emergency door, the lever being actuatable automatically by the emergency door as it pivots towards the inside of the flight deck.

BRIEF DESCRIPTION OF THE DRAWINGS

Further features and advantages will become apparent from the following description of the disclosure herein, the description being given only by way of example, with reference to the appended drawings, in which:

FIGS. 5A through 5D are diagrams illustrating a principle of operation of the emergency hatch shown in FIG. 4, actuated from the inside;

FIG. 6 is a perspective view illustrating the principle of operation of the emergency hatch shown in FIG. 4, actuated from the outside;

DETAILED DESCRIPTION

Figure 3:
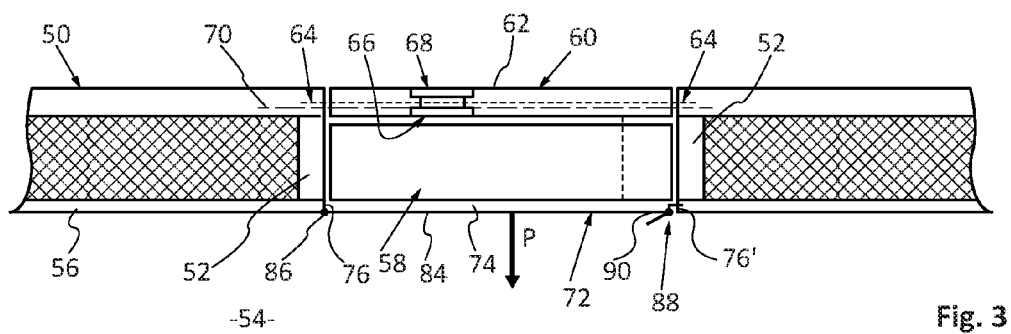
FIG. 3 is a schematic cross section through an escape opening according to one embodiment of the disclosure herein.

FIG. 3 shows a part of an airplane which comprises a fuselage with an external skin 50 attached to a structure 52, and, on the inside of the fuselage, a flight deck 54 delimited or defined by an internal bulkhead 56 spaced apart from the skin 50.

The airplane comprises at least one escape opening 58 which makes it possible to bring the inside of the flight deck 54 into communication with the outside of the airplane. In one layout, the escape opening 58 is positioned in the top part of the fuselage, vertically above the flight deck.

Figure 1:
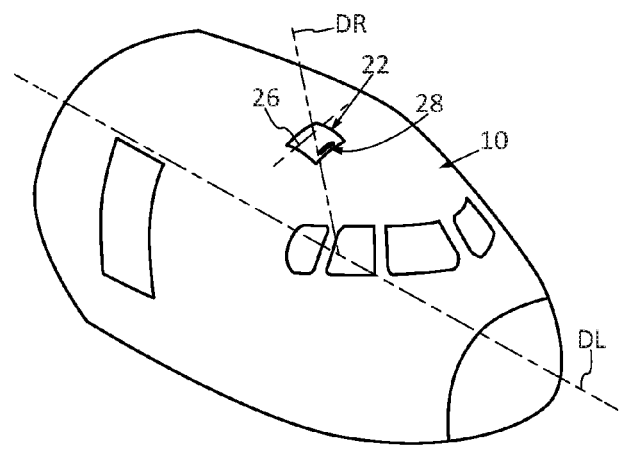
FIG. 1 is a perspective view of the front of an airplane, illustrating an emergency door positioned above a flight deck.
Figure 2:
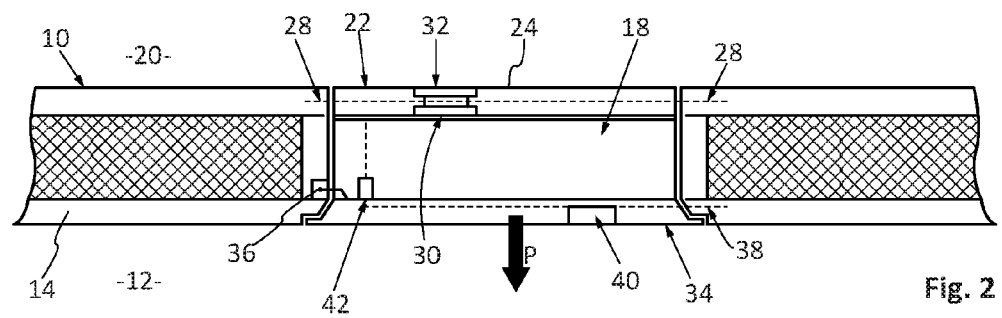
FIG. 2 is a schematic cross section through an escape opening according to the prior art.

In the rest of the description, as indicated in FIG. 1, a longitudinal direction DL corresponds to the direction which extends from the nose to the tail of the airplane. A transverse plane is a plane perpendicular to the longitudinal direction. A radial direction DR is a direction perpendicular to the longitudinal direction.

In one configuration, the escape opening 58 is delimited by a passage comprising a front wall contained in a first transverse plane, a rear wall contained in a second transverse plane, a bottom wall and a top wall that are parallel to the longitudinal direction and curved portions connecting the various walls. Thus, the escape opening 58 has an approximately square or rectangular cross section with rounded corners.

However, the escape opening 58 is not limited to this geometry and other shapes are conceivable.

The escape opening 58 is closed off by a removable emergency door 60 which is positioned in line with the skin 50 and the geometry of which is adapted to that of the escape opening 58. This emergency door 60 comprises a wall having an external surface 62 in line with the external surface of the skin 50 of the fuselage when the emergency door 60 closes off the escape opening 58. The emergency door 60 comprises locking/unlocking mechanism 64 that is controlled by an internal opening controller 66 that is actuatable from the inside of the fuselage and by an external opening controller 68 that is actuatable from the outside of the fuselage.

According to one embodiment, the emergency door 60 is connected to the structure 52 of the airplane by a pivot pin 70 parallel to one of the walls of the escape opening. It is preferably positioned level with the rear wall of the escape opening 58. When the locking/unlocking mechanism 64 is in the unlocked state, the emergency door 60 can pivot about the pivot pin 70 towards the inside of the fuselage.

At the level of the escape opening 58 and the internal bulkhead 56, the airplane comprises an emergency hatch 72 that is movable between a closed position, in which it closes off the escape opening 58, and an open position, in which it frees the escape opening 58. This emergency hatch 72 is disposed so as to be flush with the internal bulkhead 56 in the closed position.

According to one embodiment, the emergency hatch 72 comprises a frame 74 which surrounds the escape opening 58 and which cooperates with the internal bulkhead 56 so as to obtain continuous surfaces. This frame 74 comprises a first wall 76 and a second wall 76' that are approximately parallel to the longitudinal direction, and also a rear wall 78 in a transverse plane and a front wall 78' in another transverse plane. These walls 76, 76', 78, 78' form a passage which surrounds the escape opening 58.

Figure 4:
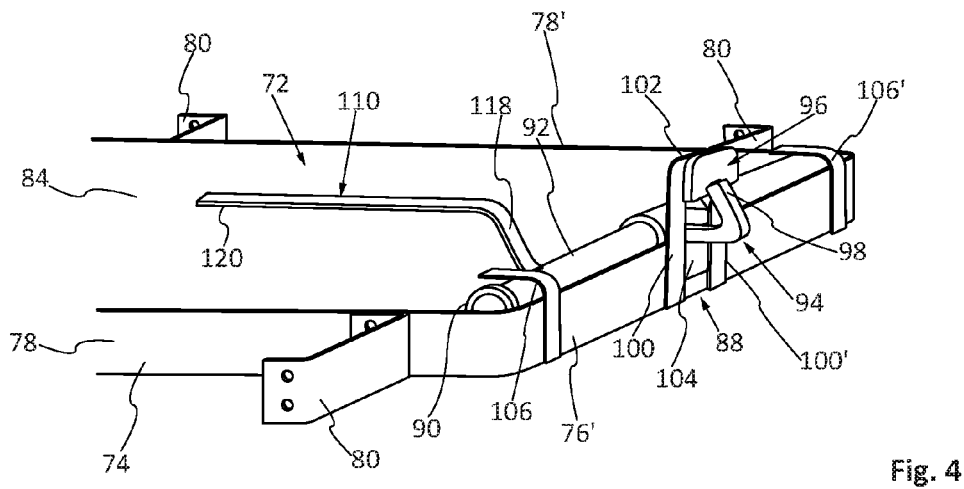
FIG. 4 is a perspective view of a part of an emergency hatch according to a first variant of the disclosure herein.
Figure 7:
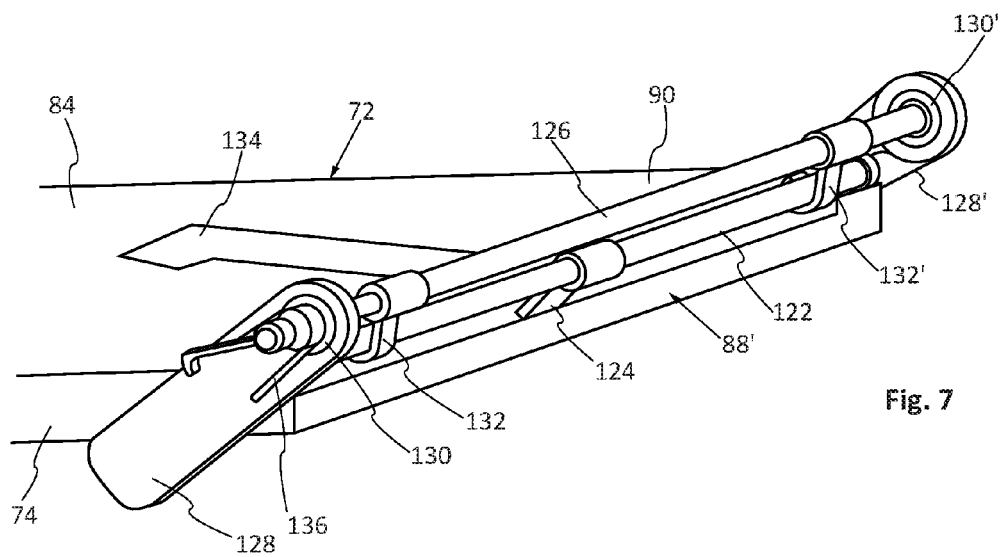
FIG. 7 is a perspective view of a part of an emergency hatch according to a second variant of the disclosure herein.

This frame 74 is connected to the structure 52 of the airplane by connecting elements 80, for example four fixing tabs that are visible in FIG. 4.

According to one feature of the disclosure herein, the emergency hatch 72 comprises:

a sheeting 84 having a first side 86 connected permanently to a first edge of the frame 74; and an locking/unlocking mechanism 88, 88' configured to keep or not keep a second side 90 of the sheeting 84 (away from the first side 86) coupled to a second side of the frame 74.

Thus, in the closed position, the sheeting 84 is coupled and tautened between the first and second walls of the frame 74 and closes off the escape opening 58. In the open position, the sheeting 84 is no longer coupled and is suspended only from the first wall of the frame 74 and frees the escape opening 58.

According to one configuration, the first wall of the frame 74 corresponds to the first wall 76 of the frame 74 and the second wall of the frame 74 corresponds to the second wall 76' of the frame 74.

According to one embodiment, the sheeting 84 has a square or rectangular outline approximately identical to the cross section of the escape opening 58.

A sheeting is understood to be an element made of fabric or plastics material that is flexible and deformable and has a small thickness.

Advantageously, the sheeting 84 is elastic or comprises at least one elastic strip so as to be tautened when it is coupled and in the closed position.

According to one embodiment, the first side 86 of the sheeting 84 is connected to the frame 74 by way of a connector which comprises a seam at the first side 86 of the sheeting 84 and a rod which is inserted into the seam, the rod comprising, at each of its ends, a tab that is connected to the frame 74 by rivets or bolts. Alternatively, the first side 86 of the sheeting 84 is gripped between the frame 74 and a backplate fixed to the frame by riveting or bolting.

FIGS. 4, 5A through 5D and 6 illustrate a first variant of the locking/unlocking mechanism 88.

According to this variant, the locking/unlocking mechanism 88 comprises a rod 92 secured to the second side 90 of the sheeting 84, the rod 92 having a hook 94 which engages with a strike 96 secured to the frame 74 and provided at the second wall 76' of the frame 74.

Preferably, the rod 92 has a length approximately the same as that of the second side 90 of the sheeting 84.

Thus, the locking/unlocking mechanism 88 is in the locked state and the sheeting 84 is coupled when the hook 94 engages with the strike 96. It is in the unlocked state and the sheeting 84 is no longer coupled when the hook 94 does not engage with the strike 96.

The hook 94 is configured such that, when the rod 92 moves towards the inside of the flight deck, the hook 94 is disengaged from the strike 96. Preferably, the hook 94 comprises an end 98 which engages with the strike 96 and which is oriented towards the emergency door 60 in the direction of the outside of the airplane.

According to one embodiment, the hook 94 is L-shaped, a first leg of the L being connected to the rod 92 and the other leg of the L being configured to engage with the strike 96 and pointing in the direction of the outside of the airplane.

According to one embodiment, the strike 96 is U-shaped with two legs 100, 100' that are parallel and spaced apart by a sufficient distance to allow the hook 94 to pass therebetween, and a base 102 which has a bearing surface for the hook 94. The base 102 is offset towards the outside of the airplane with respect to the legs 100, 100'.

The legs 100, 100' are connected to the frame 74 and the base 102 is spaced apart from the frame 74 such that the legs 100, 100', the base 102 and the frame 74 form an orifice through which the hook 94 passes. The base 102 should be at a sufficient distance from the frame 74 to allow the introduction or removal of the hook 94. As illustrated in FIG. 4, the frame 74 may comprise a cutout 104 to increase the distance between the frame 74 and the base 102.

Advantageously, at least one stabilizing tab 106 is secured to the frame 74 in order to keep the sheeting 84 in a plane allowing it to close off the escape opening 58 and to limit the tilting of the rod 92 towards the emergency door 60 when the sheeting 84 is coupled and the emergency hatch is in the closed position. According to one embodiment, each stabilizing tab 106 has an L-shaped profile, one of the legs being secured to the frame 74 and the other leg being in contact with the rod 92 and offset towards the outside of the airplane with respect to the rod 92 when the sheeting 84 is coupled.

Preferably, the hook 94 is positioned equidistantly from the ends of the rod 92 and two stabilizing tabs 106, 106' are provided close to each end of the rod 92. Thus, the stabilizing tabs 106, 106' limit the pivoting movements of the rod 92 with respect to the hook 94.

The locking/unlocking mechanism 88 comprises a lever handle 108 (visible in FIGS. 5A through 5D) that is accessible from the flight deck 54, and a lever 110 positioned between the sheeting 84 and the emergency door 60 so as to be actuated by the emergency door 60 as it opens.

According to one embodiment, the lever handle 108 comprises a first end 112 connected to the rod 92 and a second end 114 configured to be grasped by a person. The lever handle 108 extends from the rod 92 towards the first side 86 of the sheeting 84 and the inside of the flight deck, forming an angle with the sheeting 84, the angle being sufficiently large to allow a person to grasp the lever handle 108 and to pivot it in the direction of the sheeting 84 such that the hook 94 is disengaged from the strike 96. Preferably, the lever handle 108 is perpendicular to the rod 92.

According to one embodiment, the lever handle 108 comprises an elbow 116 such that the second end 114 is approximately parallel to the sheeting 84 in the locked state.

According to one configuration, the lever handle 108 is disposed in line with the hook 94.

According to one embodiment, the lever 110 comprises a first end 118 connected to the rod 92 and a second end 120 approximately parallel to the sheeting 84 in the locked state. The lever 110 extends from the rod 92 towards the first side 86 of the sheeting 84 and the outside of the flight deck. The second end 120 is spaced apart from the sheeting 84 by a distance such that the opening movement of the emergency door 60 causes the locking/unlocking mechanism 88 to pass into the unlocked state. Preferably, the lever 110 is perpendicular to the rod 92.

According to one configuration, the lever 110 is connected to the rod 92 close to the end of the rod 92 that is furthest from the pivot pin 70 of the emergency door 60.

As illustrated in FIG. 5A, in the locked state, the sheeting 84 is tautened and the hook 94 engages with the strike 96.

In order to open the escape opening 58 from the inside of the flight deck, a person grasps the lever handle 108 and exerts a force in the direction of the sheeting 84, as illustrated in FIG. 5B. Since the rod 92 is held by the stabilizing tabs 106, 106', this action causes the rod 92 to rotate about itself. Starting from a particular rotational angle, the hook 94 is no longer engaged with the strike 96 and the locking/unlocking mechanism 88 passes into the unlocked state. Inasmuch as the sheeting 84 is tautened when it is coupled, its elasticity favors the disengagement of the hook 96 and the passage of the emergency hatch into the open position, as illustrated in FIG. 5C.

Since the sheeting 84 is no longer coupled, it is suspended by its first side 86 and frees the escape opening 58, as illustrated in FIG. 5D.

The presence of the rod 92 at the second side 90 allows the sheeting 84 to hang more or less vertically.

Next, the person can open the emergency door 60 by actuating the internal opening controller 66.

In order to open the escape opening 58 from the outside of the airplane, the emergency door 60 is opened by actuating the external opening controller 68. Consequently, the emergency door 60 pivots towards the inside of the flight deck. As illustrated in FIG. 6, the emergency door 60 bears on the lever 110. Since the rod 92 is held by the stabilizing tab 106' situated at the other end of the rod 92 with respect to the lever 110, the action of the emergency door 60 on the lever 110 causes the rod 92 to pivot with respect to the stabilizing tab 106'. Starting from a particular pivot angle, the hook 94 is no longer engaged with the strike 96 and the locking/unlocking mechanism 88 passes into the unlocked state. Since the sheeting 84 is no longer coupled, it is suspended by its first side 86 and frees the escape opening 58.

FIGS. 7, 8A through 8C and 9 illustrate a second variant of the locking/unlocking mechanism 88'.

As before, the locking/unlocking mechanism 88' comprises a first rod 122 secured to the second side 90 of the sheeting 84, which comprises a lever handle 124 that is actuatable from the inside of the flight deck.

Preferably, the first rod 122 has a length approximately the same as that of the second side 90 of the sheeting 84. The lever handle 124 can be identical to the lever handle 108 in the first variant.

The locking/unlocking mechanism 88' comprises a second rod 126, parallel to the first rod 122, which is connected to the frame 74 by way of a pivot link that allows the second rod 126 to pivot about itself. According to one embodiment, the frame 74 comprises two supports 128, 128' which comprise bearings 130, 130' in which the ends of the second rod 126 are mounted in a pivoting manner.

The second rod 126 comprises at least one hook 132, open towards the outside of the flight deck, that is configured to retain the first rod 122. Advantageously, the second rod 126 comprises two hooks 132, 132'. This configuration improves the stability of the first rod 122. According to one embodiment, the hooks 132, 132' are as far apart as possible in order to reinforce the stability of the first rod 122.

The locking/unlocking mechanism 88' comprises a lever 134 that has a first end connected to the second rod 126 and a second end that is oriented towards the emergency door 60 and is actuatable by the emergency door 60 as it opens.

According to one configuration, the hooks 132, 132' are offset towards the inside of the flight deck with respect to the second rod 126. Consequently, the second rod 126 is offset towards the outside of the flight deck with respect to the first rod 122 and with respect to the sheeting 84. According to this configuration, the lever 134 extends perpendicularly to the second rod 126 in the direction of the first side 86 of the sheeting 84, in a plane approximately parallel to the sheeting 84.

The second rod 126 is mounted so as to pivot with respect to the supports 130, 130' and takes up a holding position (visible in FIG. 7) in which the hooks 132, 132' retain the first rod 124 and a pivoted position (visible in FIG. 9) in which the hooks 132, 132' no longer retain the first rod 124. Preferably, at least one torsion spring 136 is fitted at one end of the second rod 126 and positioned so as to hold the second rod 126 in the holding position.

Figures 8A, 8B, 8C:
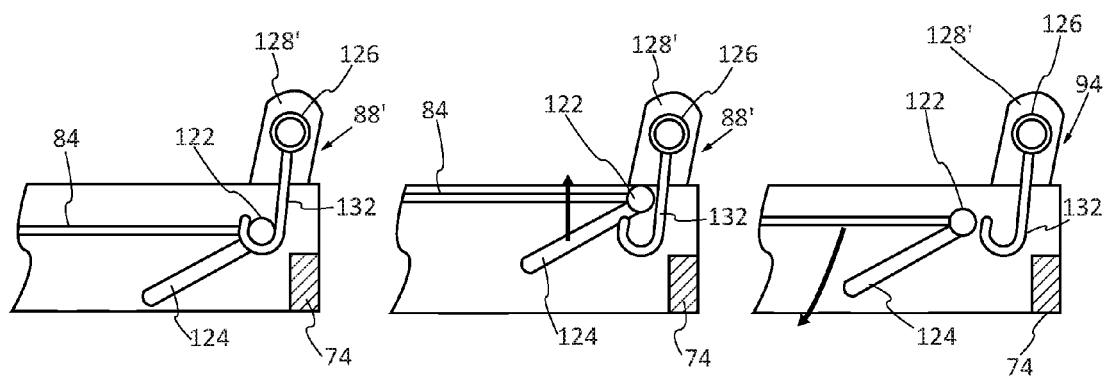
FIGS. 8A through 8C are diagrams illustrating a principle of operation of the emergency hatch shown in FIG. 7, actuated from the inside.

According to this configuration, in order to couple the sheeting 84, it is necessary to use the lever 134 to position the pivoting second rod 126 in the pivoted position, to tauten the sheeting 84 so as to dispose the first rod 124 at the hooks 132, 132' and then to release the lever 134 in order that the hooks 132, 132' retain the first rod 124, as illustrated in FIG. 8A.

According to the second variant, in order to open the escape opening 58 from the inside of the flight deck, a person grasps the lever handle 124 and exerts a force so as to move the first rod 124 in the direction of the outside of the flight deck, as illustrated in FIG. 8B. After a particular travel, the first rod 124 is no longer held by the hooks 132, 132', and the locking/unlocking mechanism passes into the unlocked state. Inasmuch as the sheeting 84 is tautened when it is coupled, its elasticity favors the disengagement of the first rod 124 from the hooks 132, 132' and the passage into the unlocked state as illustrated in FIG. 8B. Since the sheeting 84 is no longer coupled, it pivots, as illustrated in FIG. 8C, so as to free the escape opening 58.

Figure 9:
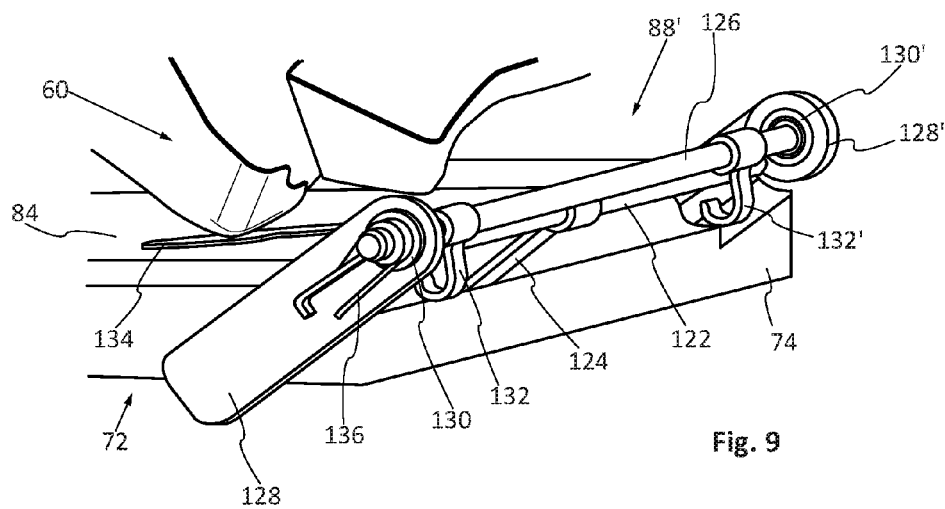
FIG. 9 is a perspective view illustrating the principle of operation of the emergency hatch shown in FIG. 7, actuated from the outside.

In order to open the escape opening 58 from the outside of the airplane, the emergency door 60 is opened by actuating the external opening controller 68. Consequently, the emergency door 60 pivots towards the inside of the flight deck. As illustrated in FIG. 9, the emergency door 60 bears on the lever 134. This action causes the second rod 126 to pivot about itself, counter to the torsion spring 136. In this position, the hooks 132, 132' no longer retain the first rod 124. Inasmuch as the sheeting 84 is tautened when it is coupled, its elasticity favors the removal of the first rod 124 from the hooks 132, 132'. Since the sheeting 84 is no longer coupled, it pivots so as to free the escape opening 58.

Of course, the disclosure herein is not limited to the embodiments described above. Thus, it is possible for the emergency hatch 72 not to comprise a frame 74, which can then be replaced by the structure 52 of the airplane or by any other element connected to the structure. Thus, regardless of the embodiment, the first side 86 of the sheeting 84, the strike 96, the stabilizing tabs 106, 106', and the second rod 126 are connected directly to the structure 52 of the airplane or indirectly to the structure 52 of the airplane by way of at least one component, for example a frame 74.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An airplane flight deck comprising an external skin attached to a structure, an internal bulkhead delimiting the flight deck, and an escape opening passing through the external skin and the internal bulkhead, the escape opening being closed off by:
    an emergency door mounted in a manner hinged on the structure between a closed position, in which the emergency door is disposed in line with the external skin and closes off the emergency opening, and an open position, in which the emergency door pivots towards the inside of the flight deck, the emergency door comprising an locking/unlocking mechanism;
    an emergency hatch that is movable between a closed position, in which the emergency hatch ensures continuity of the internal bulkhead of the flight deck, and an open position, the emergency hatch comprising a locking/unlocking mechanism;
wherein the emergency hatch comprises a sheeting permanently connected to the structure by a first side, and wherein the locking/unlocking mechanism comprises:
    a first part secured to a second side, away from the first side, and a second part secured to the structure, the first and second parts engaging in a locked state so as to couple the second side of the sheeting to the structure; and
    a rod secured to the second side and a lever handle that is actuatable from the flight deck and is connected to the rod.

2. The airplane flight deck according to claim 1, wherein the sheeting is elastic or comprises at least one elastic strip such that the sheeting is tautened when it closes off the escape opening.

3. The airplane flight deck according to claim 1, wherein the first part of the locking/unlocking mechanism comprises a hook secured to the rod, the hook engaging with the second part comprising a strike.

4. The airplane flight deck according to claim 1, wherein the emergency hatch comprises at least one stabilizing tab secured to the structure, the stabilizing tab being configured to limit the tilting of the rod towards the emergency door when the sheeting is closing off the escape opening.

5. The airplane flight deck according to claim 1, wherein the locking/unlocking mechanism comprises a lever which has a first end connected to the rod and a second end oriented towards the emergency door, the lever being actuatable automatically by the emergency door as it pivots towards the inside of the flight deck.

6. The airplane flight deck according to claim 1, wherein the locking/unlocking mechanism comprises a second rod which has at least one hook configured to retain the first rod, the second rod being connected to the structure by a pivot link so as to take up a holding position in which the hook retains the first rod and a pivoted position in which the hook no longer retains the first rod.

7. The airplane flight deck according to claim 6, wherein the locking/unlocking mechanism comprises at least one torsion spring configured to hold the second rod in the holding position.

8. The airplane flight deck according to claim 6, wherein the locking/unlocking mechanism comprises a lever which has a first end connected to the second rod and a second end oriented towards the emergency door, the lever being actuatable automatically by the emergency door as it pivots towards the inside of the flight deck.

* * * * *